United States Patent [19]

Peters

[11] 3,732,026
[45] May 8, 1973

[54] HAND OPERATED POWER TOOL AND CHUCK THEREFOR

[76] Inventor: Rudolph W. Peters, 5786 Balmoral Drive, Oakland, Calif. 94619

[22] Filed: Jan. 11, 1971

[21] Appl. No.: 105,251

[52] U.S. Cl. ............. 408/124, 408/141, 408/240, 60/54.5, 279/122
[51] Int. Cl. ............. B23b 45/02, B23b 31/30
[58] Field of Search ............. 408/124, 238, 239, 408/240, 234, 141; 279/4; 90/11 D

[56] References Cited

UNITED STATES PATENTS 2,557,582   6/1951   Turrettini ............. 90/11 D
2,807,732   9/1957   Kurtovich ............. 408/240 X Primary Examiner—Gil Weidenfeld
Attorney—Harris Zimmerman

[57] ABSTRACT

A hand power tool is described having a drive arrangement providing on initial energization of the unit automatic gripping of a tool. The drive arrangement includes a fluid pump which is driven by the motor of the tool when it is first started. The pump delivers fluid pressure to a chamber within the tool chuck and drives a piston therein which, in turn, drives the jaws of the chuck into clamping engagement with the tool piece shank. The jaws of the chuck are meshed with one another in a manner assuring that they uniformly move radially inward to grip the shank and align the tool with the rotational axis of the chuck.

13 Claims, 17 Drawing Figures

PATENTED MAY 8 1973
3,732,026
SHEET 1 OF 5
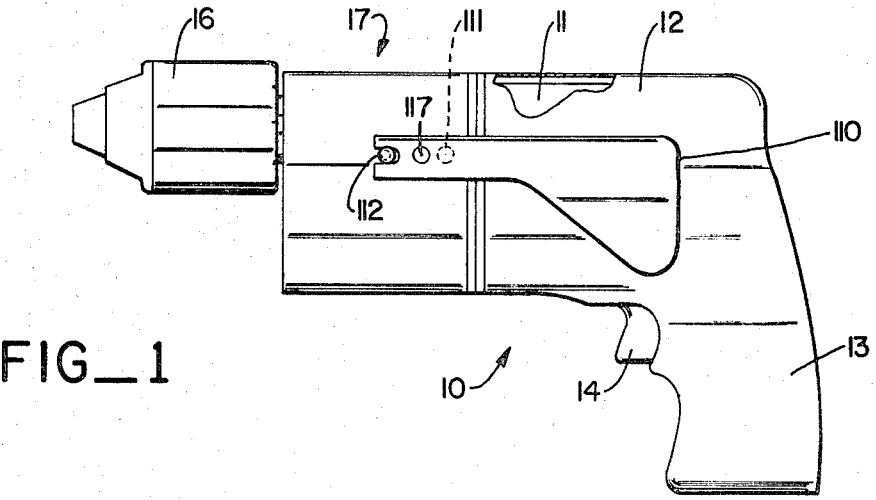
FIG_1
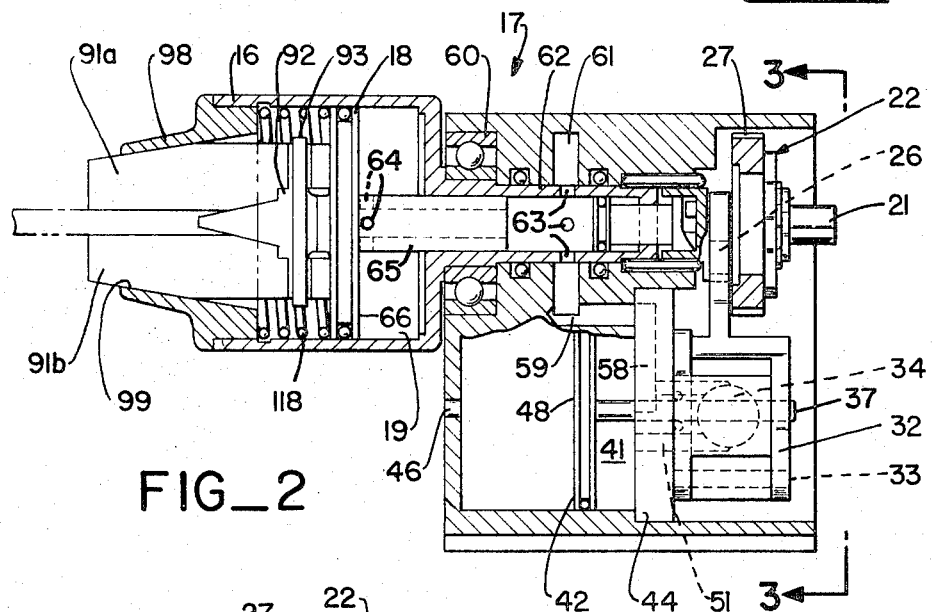
FIG_2
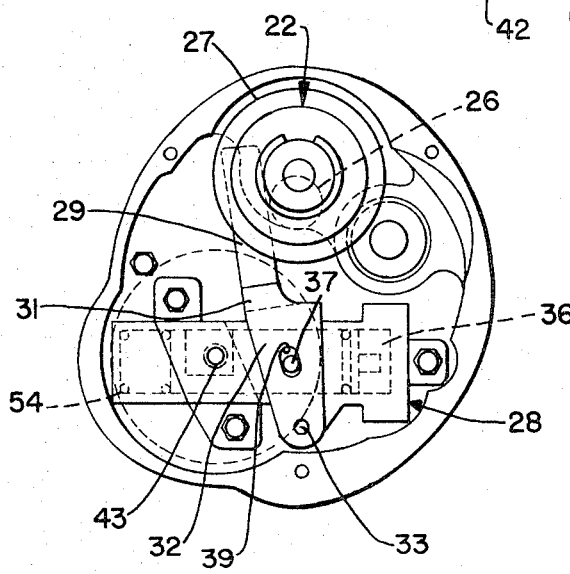
FIG_3
INVENTOR.
RUDOLPH W. PETERS
BY
Harry Zimmerman
ATTORNEY

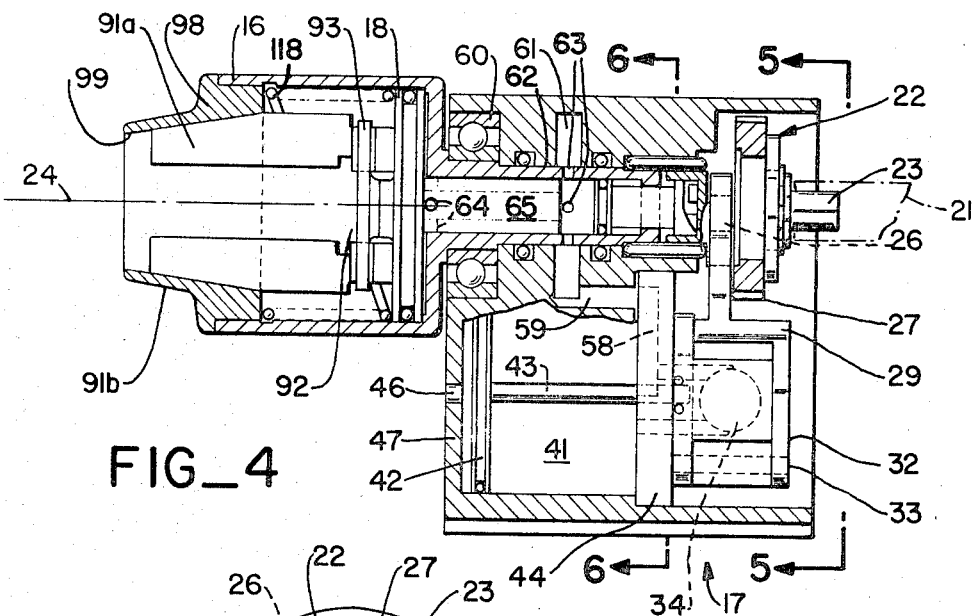
FIG_4
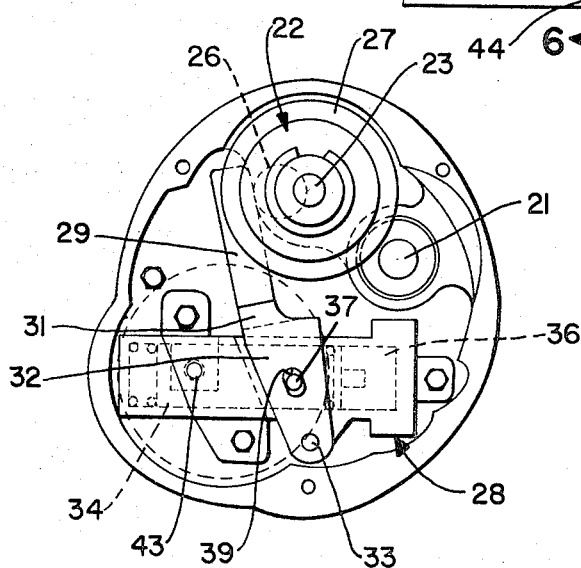
FIG_5
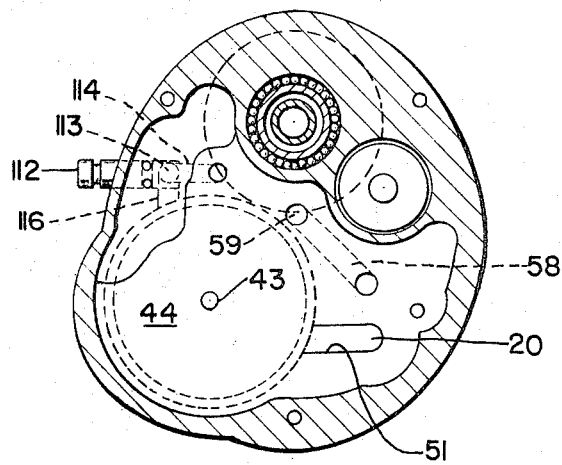
FIG_6
INVENTOR.
RUDOLPH W. PETERS
BY
ATTORNEY

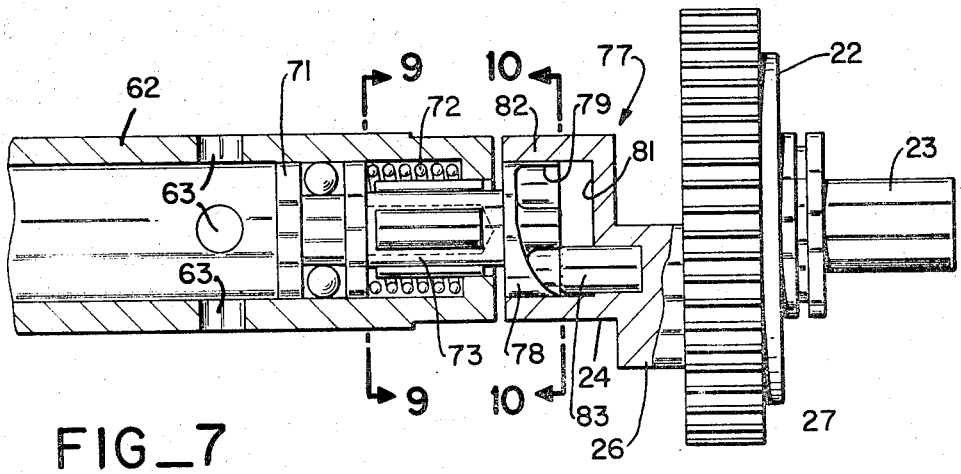
FIG_7
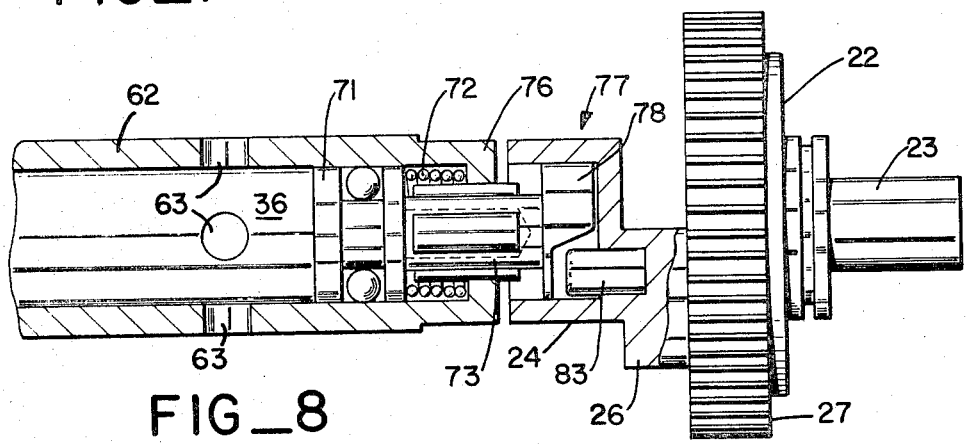
FIG_8
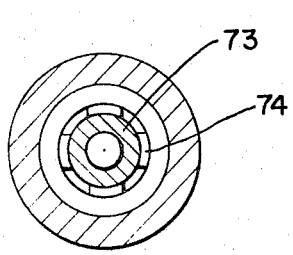
FIG_9
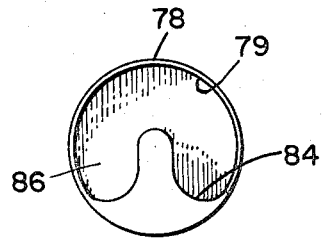
FIG_10
INVENTOR.
RUDOLPH W. PETERS
BY
ATTORNEY

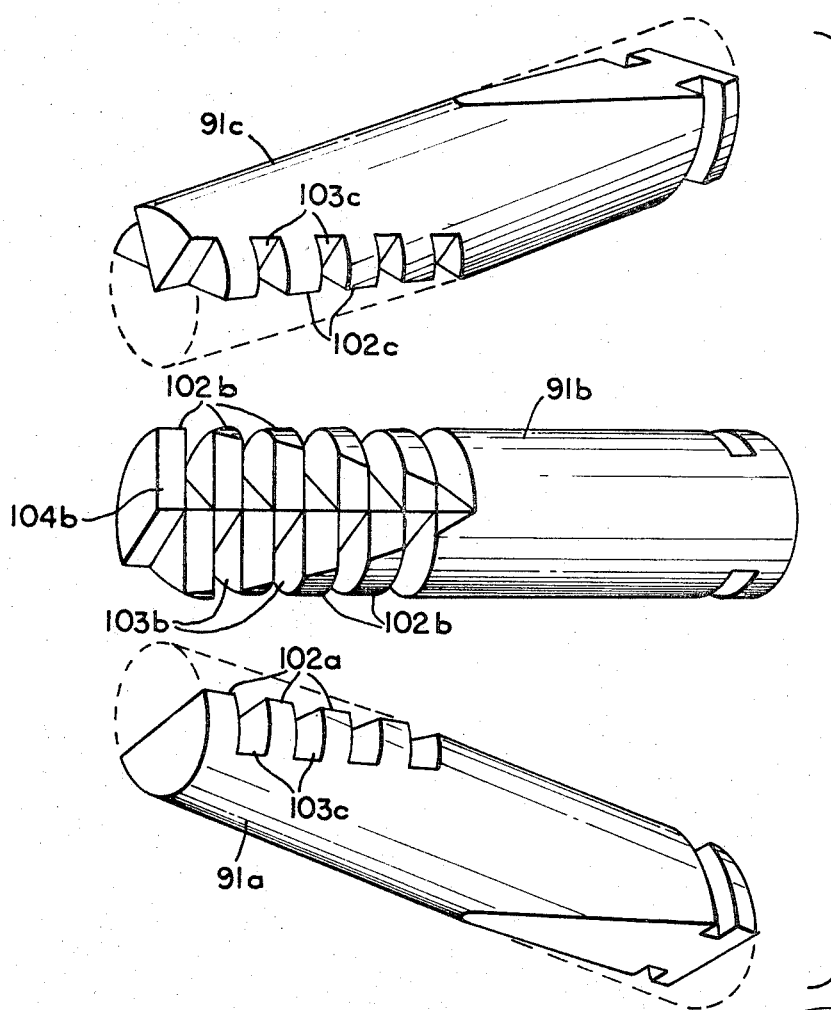
FIG_11
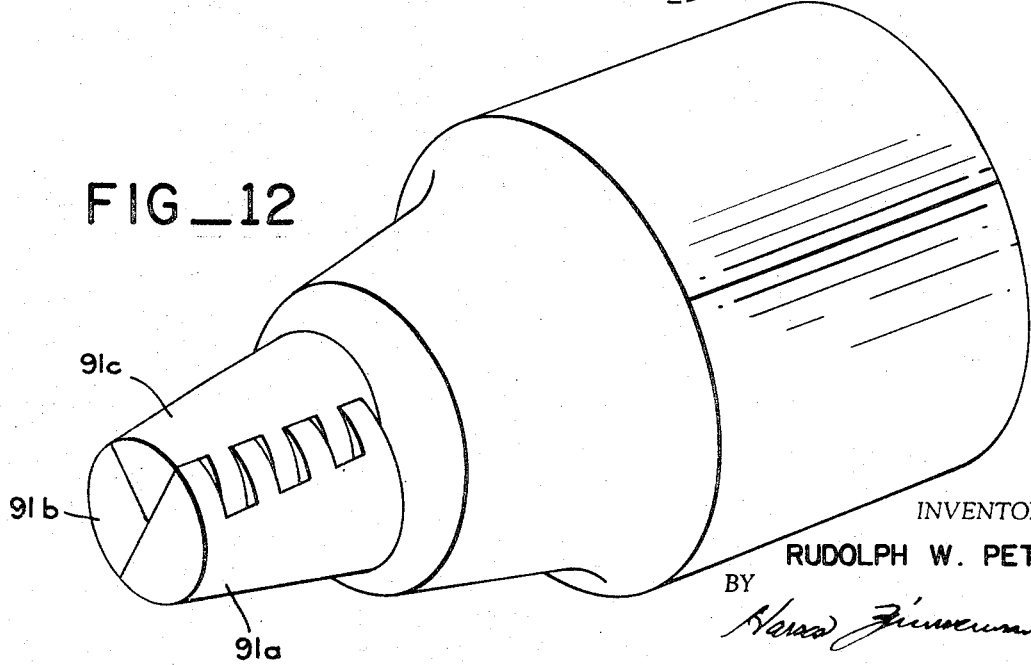
FIG_12

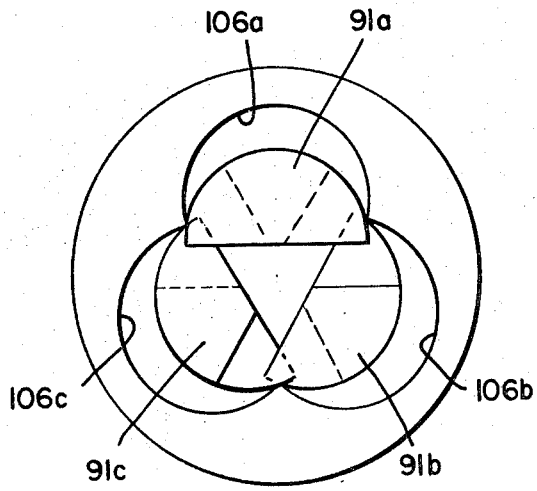
FIG_13
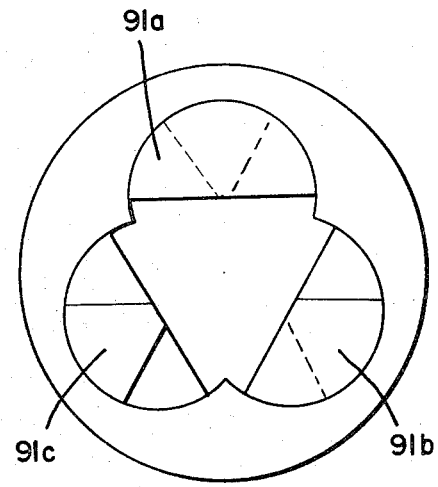
FIG_14
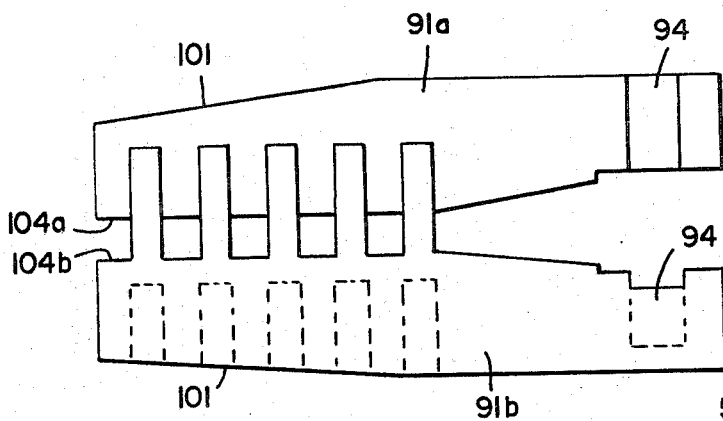
FIG_15
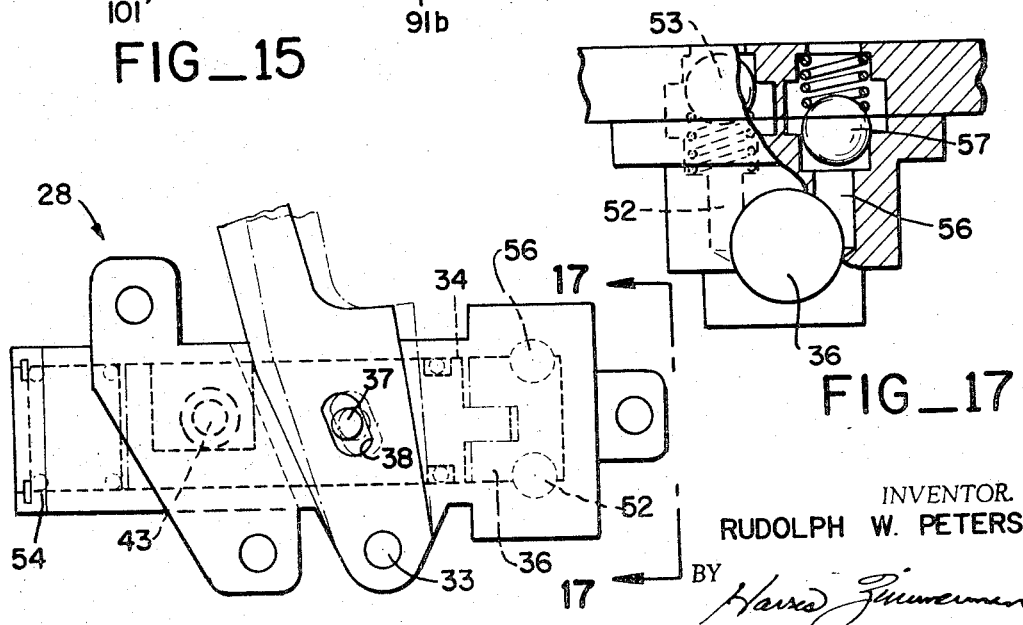
FIG_16  FIG_17
INVENTOR.
RUDOLPH W. PETERS
BY
ATTORNEY

HAND OPERATED POWER TOOL AND CHUCK THEREFOR

BACKGROUND OF THE INVENTION

The present invention relates to power tools and, more particularly, to a hand power tool providing automatic gripping of a tool shank or the like upon initial energization thereof and having a chuck which upon gripping the shank of the tool or the like automatically centers the tool on the rotational axis of the chuck.

Hand operated rotary power tools which can be easily carried and directed manually, such as small bit drills and the like, are used both by the professional carpenter and the home hobbyist or do-it-yourself repairman. Such tools normally include a prime mover in the form of a small electric motor which is encased within a housing having a pistol hand grip and a trigger or the like for its energization. The output shaft of the electric motor is connected to a chuck for holding a tool or other member it is desired to rotate. The chuck is axially rotated by the motor to thereby provide the desired rotational motion of the tool.

While tools of this type have been widely adopted because of their handiness and low cost, they do have several disadvantages. For one thing, the replacement of one tool in the chuck for another is a relatively time consuming and troublesome task. An auxiliary tool such as a chuck key is generally required to both loosen the chuck jaws from a tool piece shank and then tighten the same again about the shank of the new tool piece. Besides this requiring an operator keeping the auxiliary tool readily available, quite often an inordinate amount of force seems necessary to either loosen the chuck to enable the removal of a tool or to tighten a chuck sufficiently to provide satisfactory clamping of the tool. Moreover, with most conventional chucks, one must be careful in tightening the same that the tool is appropriately clamped exactly on the rotational axis of the chuck so that it does not wobble upon being used. In this connection, the jaw elements of many conventional chucks can easily become askew during the tightening operation and cause misalignment of the tool. It is also not unusual for the chuck to loosen during use of the tool, requiring interruption of the work in order to retighten the same.

SUMMARY OF THE INVENTION

The present invention relates to a power tool of the described type which provides automatic clamping by a chuck of a tool piece or other member. It does so by including as a part thereof a drive arrangement which diverts the force of the prime mover or motor when it is initially energized to utilize the same in causing the chuck to clampingly engage the tool piece prior to it being rotated. Thus, to provide the necessary rigid securance of a tool piece, the operator need only activate the power tool such as by depressing the trigger normally depressed in conventional tools only when it is desired to rotate the tool piece to do work. The driver mechanism of the power tool of the invention is so designed that is assures that the clamping pressure provided by the chuck remains on the tool piece until it is desired to release the tool. At that time, a simple release means provided as part of the unit merely need be activated to remove the tool for replacement or the like.

It will be appreciated that for a power tool to be effective in automatically providing the clamping, some means must also be provided to assure that when the chuck does clamp the tool piece, the tool piece is properly aligned with the rotational axis of the chuck. The power tool of the invention also includes a chuck which automatically assures such proper alignment. To this end, the jaw elements of the chuck are intermeshed with one another so that upon being moved axially forward within the chuck collar as is conventional, they will be moved together and, hence, be uniformly moved radially inward to grip the tool piece. This results in the gripping surfaces of the jaw elements being equally spaced from the chuck rotational axis during the gripping operation so that upon encountering the tool piece they will automatically bring it into alignment with the axis as they grip the same.

Although the chuck of the invention is particularly useful and important when used with a hand power tool having the automatic tool piece clamping feature described above, it will be recognized that it is also useful for providing automatic centering when used with other and more conventional power tools. Moreover, while the drive arrangement of the power tool is most useful in providing for automatic clamping of a tool piece as discussed, it will be appreciated from the more detailed description that the drive arrangement is also advantageously usable in other hand power tools, such as bolt cutters, which do not rely on the use of a chuck to grip a tool piece as described. Other advantages and features of the invention will also become apparent from the following detailed description of a preferred embodiment.

BRIEF DESCRIPTION OF THE DRAWINGS

With reference to the accompanying five sheets of drawings:

FIG. 1 is a side elevation view with a portion broken away of a preferred portable hand power tool of the invention;

FIG. 2 is an enlarged cross-sectional and broken away view of a portion of the power tool of FIG. 1, including the chuck and the driver of the invention;

FIG. 3 is an end view of the driver portion of the power tool taken on a plane indicated by the lines 3—3 in FIG. 2;

FIG. 4 is an enlarged cross-sectional and broken away view similar to FIG. 2, and illustrating various parts of the mechanism in different positions;

FIG. 5 is an end view similar to FIG. 3, and taken on a plane indicated by the lines 5—5 in FIG. 4;

FIG. 6 is a cross-sectional view taken substantially on a plane indicated by lines 6—6 in FIG. 4;

FIG. 7 is an enlarged partial broken away view of the power drive shaft and the clutch assembly for selectively coupling the shaft to the chuck stem for rotating the latter;

FIG. 8 is an enlarged partial view similar to FIG. 7, and illustrating the clutch in an engaged position;

FIG. 9 is a cross-sectional view taken substantially on a plane indicated by the lines 9—9 in FIG. 7, and illustrating details of the clutch assembly;

FIG. 10 is a cross-sectional view taken substantially on a plane indicated by the lines 10—10 in FIG. 7, and illustrating other details of the clutch assembly;

FIG. 11 is an enlarged and exploded isometric view of the preferred jaw element arrangement for the chuck of the power tool of the invention;

FIG. 12 is an enlarged isometric view of the chuck of the power tool;

FIGS. 13 and 14 are end views of the chuck of the power tool of the invention illustrating the jaw elements thereof in different positions;

FIG. 15 is an enlarged assembly view of two of of the jaw elements of the chuck illustrating the manner in which they are meshed;

FIG. 16 is an enlarged broken away view of the fluid pump of the power tool of the invention illustrated in phantom the piston and piston lever arm in an alternate position; and FIG. 17 is a broken away and partial end view of the fluid pump and the wall within the apparatus to which it is secured looking from a plane indicated by the lines 17—17 in FIG. 16.

DESCRIPTION OF THE PREFERRED EMBODIMENT

A portable and hand operated power tool of the invention is fully depicted in FIG. 1 and generally referred to by the reference numeral 10. Such tool includes, as is conventional, a prime mover, such as electric motor 11, encased within a housing 12 having a portion 13 shaped into a hand grip facilitating manual operation of the tool. An on-off switch for the electric motor is provided in the form of a trigger 14 at a location at which an operator holding the tool can easily manipulate the same.

The power tool 10 includes a driver arrangement which is connected between the prime mover 11 and a chuck 16 to be described in more detail hereinafter. In keeping with the invention, the driver, generally referred to by the reference numeral 17, diverts the initial force provided by the prime mover when it is activated, and causes such force to effect clamping engagement of the shank of a tool or other member inserted into the chuck. In its basic aspects, the driver 17 is fluid pressure operated, or, more specifically, includes an oil hydraulic system for converting rotary motion from the output of the motor 11 to translation of a piston 18 located within a chamber 19 defined by the chuck 16 (FIGS. 2 and 4). As will be described in detail later, translation of the piston 18 axially of the chuck toward its open end causes the desired clamping of the tool. The driver 17 is also designed to directly couple the output of the prime mover to the chuck for rotating the latter after the tool shank or other member is appropriately clamped in the chuck.

In order to provide the fluid pressure necessary to drive the piston 18, the driver 17 includes a fluid pump which is responsive to energization of the prime mover by delivering fluid pressure to piston chamber 19. More particularly, the electric motor 11 axially rotates an output shaft 21 which is coupled via a cushion drive gear assembly 22 to the driver 17. The gear assembly 22 is mounted on a drive shaft 23 which is coaxial with the rotational axis 24 of the chuck 16. As can best be seen from FIGS. 7 and 8, a cam in the form of a disc 26 is mounted on the face of the main gear 27 of drive gear assembly 22 opposite that from which the shaft 23 extends. While cam disc 26 is circular in cross-section, it is eccentrically mounted with respect to the rotational axis of gear 27 and shaft 23 in order to provide camming motion Upon rotation of drive gear assembly 22 by the motor, cam disc 26 revolves about axis 24 and drives a fluid pump, generally referred to by the reference numeral 28. More particularly, such cam is engageable with the cam follower arm 29 on a drive lever 31. The lower end of drive lever 31 is bifurcated to provide legs 32 extending on opposite sides of the pump 28. A pin 33 passing through the lower ends of the legs 32 mounts the drive lever 31 for pivotal or levering motion about an axis located on the side of pump 28 opposite that on which the cam disc 26 is located. As can best be seen from FIGS. 3, 5 and 16, the pump 28 includes a pumping piston 34 which is reciprocal within the pump chamber 36. Drive pins 37 extending laterally from the piston 34 coact with the drive lever 31. That is, such pins extend through axial slots 38 on opposite sides of the casing for the pump and are engaged within drive slots 39 in the legs 32 of the drive lever 31.

From the above, it will be appreciated that when lever arm 29 is in engagement with cam 26, the lever arm will be pivoted or levered about pin 33 by cam 26 and will, in turn, reciprocate piston 34 within pump chamber 36. Such reciprocal motion draws fluid from a fluid reservoir and delivers it to the chuck chamber 19 located in the chuck behind the piston 18. More particularly, the driver 17 of the invention includes at a location in front of the pump 28, a reservoir 41 for a hydraulic fluid such as an oil. As is illustrated, reservoir 41 is provided with a piston 42 which is axially secured to a shaft 43 passing through an end wall plate 44 of the reservoir and thence through the piston chambers of the pump 28. The piston 34 of the pump is relieved adjacent the location of the shaft 43 so that its ability to reciprocate in chamber 36 is not hindered by such shaft.

The piston 42 within reservoir 41 acts as a movable wall maintaining the volume of reservoir 41 the same as the volume of the fluid therein. That is, the piston 42 acts under the influence of an increase or decrease in the fluid pressure within chamber 41 to respectively expand the volume of the chamber so that it can accommodate additional fluid and reduce the volume as the fluid is exhausted therefrom. It is to be noted that an aperture 46 in the wall 47 of the driver exposes the face 48 of the piston 42 to atmospheric pressure to enable its operating as aforesaid. FIGS. 2 and 4 respectively illustrate the location of the piston 42 before and after pump 28 has removed fluid from the reservoir 41.

Upon drive lever 31 being cammed by cam disc 26 in the counterclockwise direction as viewed, for example, in FIG. 3, the pump piston 34 is translated to the left and fluid is drawn into the chamber 36 from the reservoir 41. More particularly, a fluid passage 51 extends through wall 44 and thence through the pump casing to communicate the reservoir 41 with an inlet or intake port 52 of the pump. As shown in FIG. 17, a check valve ball 53 is spring loaded against a seat in the port 52 to enable fluid to be drawn into the chamber 36 through such port but not exhausted therethrough.

A compression spring 54 is provided within pump chamber 36 to normally urge piston 34 to the right as viewed in, for example, FIG. 16. It will thus be appreciated that when cam 26 moves drive lever 31 in a counterclockwise direction as aforesaid the piston 34 is translated against the pressure of spring 54. Such spring acts to then drive the piston to the right in an exhaust stroke. That is, after fluid is drawn from the reservoir 5 into the chamber 36 by movement of the piston to the left, the spring 54 will translate the piston 34 on an exhaust stroke to exhaust the fluid from the chamber through an exhaust or outlet port 56. The port 56 communicates through a ball check valve 57 preventing reverse flow through the port 56 with a passage 58. As shown, passage 58 extends through the pump casing and the wall plate 44 to communicate with a lateral passage 59 in the body of the driver housing.

The passage 59 communicates with an annular space 61 within the housing body which surrounds a hollow stem 62 on the rear end of chuck 16. The stem 62 extends along the rotational axis of such chuck into an appropriate bore through the driver 17, within which it is mounted for rotation such as by the bearing 60.

As is illustrated, the stem 62 has extending therethrough an annular array of fluid ports 63 which communicate the annular space 61 with the interior of the stem 62. A hollow shaft 65 which is axially secured to the piston 18 extends into the stem 62 and acts as a guide for the translational motion of the piston 18. Fluid introduced to the interior of the chuck stem 62 via annular space 61 and ports 63 can flow through the hollow piston shaft 65 and into the chuck piston chamber 19 via ports 64 which extend through shaft 65 adjacent the face 66 of piston 18. Thus, fluid exhausted from the pump 28 upon the return of the piston 34 thereof under the influence of spring 54 is delivered to the chuck chamber 19 to drive the piston 18 forwardly in such chuck. As will be explained, this forward motion of the piston causes jaw elements of the chuck to center and automatically grip the shank of any tool or other member it is desired to rotate and which is inserted into the chuck. It will be appreciated, though, that once the piston 18 has been moved forward to the extent necessary to have the jaw elements tightly engage the shank of a tool, continued buildup of pressure by the pump 28 can be detrimental to the apparatus. It is for this reason that the force for the drive or exhaust stroke of the pump piston 34 is provided by the compression spring 54. That is, once the pressure within the chamber 19 reaches a predetermined value which is greater than that which can be overcome by compression of spring 54, the spring will be incapable of returning the piston 34 to the right within the pump after the intake stroke of such piston. Because of the pin connection between piston 34 and drive lever 31, the back pressure on the piston will also maintain the lever arm 29 out of following engagement with the cam 26 once the spring 54 can no longer drive the piston. The result is that further revolution of the cam 26 about the axis 24 does not result in further activation of the pump. However, the force of compression of spring 54 will maintain pressure on the piston and, hence, tend to maintain the jaw elements in gripping engagement with a member held thereby. Because of such, the apparatus of the invention has the advantage that the tool does not tend to become loosened during its rotation by the chuck and it is not necessary to interrupt the operation in order to tighten the chuck as is often required with conventional arrangements.

From the above, it will be seen that upon initial energization of the motor 11, the force provided by the rotary motion of its output shaft is diverted to drive the piston 18 forwardly within the chuck. Means are also included for automatically connecting the motor to the chuck for axially rotating the latter after a predetermined amount of pressure has been applied to the piston 18 to effect the clamping engagement of a member placed within the chuck. More particularly, and as is best illustrated in FIGS. 7 and 8, a piston 71 is provided within the interior of chuck stem 62 adjacent its end furthest removed from the chuck proper. The piston 71 is normally urged by a compression spring 72 to the left within the stem to the position shown in FIG. 7. However, upon the pressure of the fluid within the interior of stem 62 reaching a predetermined value which is greater than that necessary to assure good clamping of a tool within the chuck, continued buildup of pressure within the stem due to operation of the pump will drive the piston 71 rearwardly against the pressure of spring 72 to the location depicted in FIG. 8. In this connection, it should be noted that while the amount of pressure necessary to move the piston 71 is greater than that necessary to effect the desired clamping, it is not greater than that which is capable of being provided by the pump 28 under the influence of spring 54.

Piston 71 has a piston shaft 73 extending axially from the face thereof opposite that which is exposed to the fluid pressure within chuck stem 62. As can best be seen from FIG. 9, shaft 73 has axially extending splines 74 in engagement with complimentary grooves in the end wall 76 of the chuck stem 62. This splined connection of the piston shaft 73 to the chuck stem allows the piston 71 to be moved axially within the stem as discussed, but keys the two members together for rotation as a unit.

A clutch, generally referred to by the reference numeral 77, is engaged by movement of piston 71 to the right to transmit the rotary motion of the electric motor to the chuck. The clutch 77 includes a clutch disc 78 which is axially secured to the end of piston shaft 73 and has a clutch cavity 79 in the face thereof opposite that to which the shaft 73 is secured. Clutch disc 78 rides axially within a cylindrical cavity 81 which is coaxial with the rotational axis 24 of the chuck and is defined by a cylindrical extension 82 of the cushion drive gear assembly 22. The clutch drive pin 83 projects into the cavity 81 for selective engagement with the clutch cavity 79 in the clutch disc 78. Such pin 83 is normally out of engagement with the cavity and thus does not transmit the rotary motion of drive assembly 22 to the clutch disc 79. This condition of the clutch assembly and drive arrangement is depicted in FIG. 7. However, upon the pressure applied to piston 71 overcoming the force of spring 72 and compressing the same, the clutch pin 83 is received within the clutch disc cavity 79 because of the translation of such clutch disc in the extension 82 due to the piston movement. The pin 83 then engages the shoulder 84 in the clutch disc cavity 79 and imparts its revolution about the axis 24 to the clutch disc. Thus, the rotary output shaft of the motor is coupled to the chuck to rotate the same. It will be noted that the clutch disc cavity 79 includes a camming surface 86 facilitating smooth engagement with the clutch drive pin 83.

The particular manner in which the shank of a tool piece or other member is gripped by the chuck 16 will now be described. As mentioned previously, the clamping action is obtained by forward translation within the chuck chamber 19 of the piston 18. The actual clamping operation is provided by a plurality of jaw elements in this case three jaw elements 91a, 91b and 91c. As is shown in FIGS. 2 and 4, such jaw elements are secured to piston 18 for movement therewith axially within the chuck. More particularly, a cylindrical projection 92 extending axially from the front face of chuck piston 18 supports a coaxial carrier ring 93. Ring 93 is received within complementary grooves 94 adjacent the rear ends of each of the jaws 91.

The jaw elements 91 are conventional in the sense that upon being moved axially forward within the chuck 16 they are moved radially inward to grip the shank of a tool. To this end, the chuck includes a collar portion 98 which has an inner surface 99 which, in its general aspects, tapers conically inward toward the forward end of the chuck. Each of the jaw elements have outer surface portions 101a-c which have complementary conical shapes providing for cooperation between such surfaces and the collar portion to move each of the jaws radially inward toward the rotational axis 24 of the chuck upon the piston translating the jaws forward.

As a particularly important feature of the invention, the jaw elements differ from conventional jaw elements in that each cooperates with the others and with the collar portion 98 to assure that when they are moved radially inward, they automatically center whatever member is to be gripped thereby on the rotational axis of the chuck. To this end, means are provided intermeshing adjacent jaw elements for uniform radial motion together toward the rotational axis. The preferred means for providing the desired intermeshing is depicted in FIGS. 11 through 15. As is illustrated therein, each of the jaw elements 91a-c includes alternate tongues 102a-c and grooves 103a-c which are meshable with the complementary grooves and tongues on the adjacent jaw element. Such intermeshing maintains the jaws in the same relative positions axially of the chuck as they are moved by the piston. That is, because of the intermeshing, the jaws must move together axially of the piston whenever any one of them is so moved axially. Moreover, when the jaws are intermeshed and the outer surface of each is in engagement with the inner surface 99 of the collar portion 101, the gripping surfaces 104a-c defined by the jaws are spaced equally from the rotational axis of the chuck. Thus, as the jaws are translated into the collar portion 98, the gripping surfaces thereof are moved uniformly radially inward in a manner by which they are at all times equally spaced from the rotational axis. Thus any member which is located between the same to be gripped is automatically moved toward the rotational axis by the jaws and aligned therewith. In this connection, it is to be noted that the tongues and grooves of adjacent jaw elements can intermesh to a sufficient depth to allow the jaw elements to close radially inward all the way onto the rotational axis of the chuck. For this purpose in this particular instance in which three jaw elements are provided, each of the tongues 102 and complementary grooves 103 have an angular extent of 60°.

The particular configuration of the inner surface 99 of the collar portion 98 aids in providing the uniform motion of the jaw elements toward the rotational axis. More particularly, as can best be seen from FIGS. 13 and 14, this inner surface is specifically defined by three identical conic sections 106 a-c which are inscribed within a larger conic section and merge to define the chuck cavity so that it is symmetrical about the axis of the larger conic section. The outer portion 101 of the jaw elements have complementary conical outer surfaces which are cooperable with associated ones of the conic sections 106. This particular collar inner surface-jaw outer surface relationship assures that the jaws are maintained equally spaced with respect to one another circumferentially about the rotational axis 24 during their motion.

Means are provided for releasing the pressure of the jaw elements on a tool piece or other member whenever it is desired to remove the tool piece or replace the same. For this purpose, a release lever 110 is provided which, as is illustrated in FIG. 1, projects to a location on the side housing 12 for the power tool at which it is easily depressed by an operator holding the tool. The release lever 110 is pivotally secured to the housing of driver 17 at 111 for pivotal motion toward and away from the power tool body. The forward end of lever 110 is slotted to receive a plunger 112 which normally maintains a ball valve 113 against a seat within a fluid passage 114. The passage 114 communicates the annular space and, hence, the chuck chamber 19, with a return passage 116 communicating with the reservoir 41. A compression spring 117 (FIG. 1) is provided for normally maintaining the plunger 112 in a depressed condition at which it will maintain the ball 113 in blocking relationship to communication between passage 114 and return passage 116. Thus, whenever it is desired to release the clamping engagement of the jaw elements 91 on a tool piece or the like, the operator need only press the release lever 110. This will result in the plunger 112 being raised to free the ball 113 from its seat and allow fluid return communication between the chamber 19 and the reservoir 41. A compression spring 118 provided in the chuck for urging the piston 18 rearwardly will then act to drive the piston 18 to the right and exhaust the fluid in chamber 19 into the reservoir. The withdrawal of such piston in this manner by the spring 118 will also act to retract the jaw elements 91 from their extended positions and release the same from the tool piece.

It will be appreciated from the above description that certain relationships must be maintained between the areas of the pistons and the strengths of the springs which operate the same in order to assure action by the appropriate pistons. While such relationships have been already described in a general manner, specific values found appropriate in one specific embodiment in the invention are as follows:

| | |
|---|---|
| Working area of pump piston 34 | 0.172 inches |
| Pump spring 54 | 50 pounds pressure |
| Working area of clutch piston | 0.1105 inches |
| Clutch spring 72 | 30 pounds pressure |
| Working area of chuck piston 18 | 2.073 inches |
| Return chuck piston spring 118 | 80 pounds pressure |
| Spring force on rest of release bell valve 113 | 15 pounds |

It will be further appreciated that although the chuck incorporated as part of the invention is especially useful and desirable in a power tool in which automatic gripping of a tool piece is provided as described, the chuck can be advantageously used with other power tools. Moreover, although the fluid drive system of the power tool is most useful in providing the automatic gripping, it can be used with other power tools, such as bolt cutters and the like, in which it is desired to provide an axial motion rather than a rotary motion. In this connection, in some arrangements such as the bolt cutter arrangement mentioned, the clutch means providing rotary motion after operation of the fluid pressure drive arrangement may not be required. Because of these and other alternate arrangements and changes which will be apparent to those skilled in the art, it is only intended that the protection afforded applicant be limited by the claims.

I claim:

1. A power tool including a chuck for releasably clamping a tool member to which it is desired to impart rotary motion, a prime mover operatively connected to said chuck for imparting rotation thereto, and a driver operatively connected between said prime mover and said chuck, said driver including means for diverting force from said prime mover upon initial energization thereof to effect clamping engagement by said chuck of a member placed therein for rotation, and said driver including means for automatically connecting said prime mover to said chuck for axially rotating the latter after effecting said clamping engagement of a member placed within said chuck.

2. The power tool of claim 1 wherein said means connecting said prime mover and said chuck for axial rotation provides a direct mechanical connection between the two.

3. The power tool of claim 1 wherein said power tool is a portable hand tool and said prime mover is encased within a housing having as a part thereof a hand grip facilitating manual positioning and use of said tool.

4. The power tool of claim 1 wherein said driver is operated by fluid pressure.

5. The power tool of claim 4 wherein said driver includes a fluid pump responsive to energization of said prime mover by providing fluid pressure and means responsive to said fluid pressure by causing said clamping engagement by said chuck of said member.

6. The power tool of claim 5 wherein said means responsive to said fluid pressure includes a piston translatable by said fluid pressure to drive jaw elements of said chuck into clamping engagement with said member.

7. The power tool of claim 6 wherein said chuck includes a collar portion surrounding said jaw elements and said piston translates said jaw elements axially therein in one direction in response to said fluid pressure, the inner surface of said collar portion and the outer surfaces of said jaw elements cooperating to move each of said jaw elements radially inward toward the rotational axis of said chuck upon said piston translating the same in said one direction, and said jaw elements include means intermeshing the same for uniform radial motion together toward said rotational axis to automatically center said member on said rotational axis as the same is gripped by jaw elements.

8. The power tool of claim 7 wherein said means intermeshing said jaw elements for axial movement together includes alternate tongues and grooves on each jaw element meshable with complementary grooves and tongues on adjacent jaw elements.

9. The power tool of claim 8 wherein the inner surface of said collar portion tapers conically inward in a direction away from said piston and the outer surfaces of said jaw elements are correspondingly tapered to provide said uniform radial motion of said elements upon translation thereof by said piston.

10. The power tool of claim 9 wherein means are provided responsive to the application by said pump of pressure greater than a predetermined pressure by coupling the rotary output shaft of said prime mover to said chuck to rotate the latter.

11. The power tool of claim 10 wherein said means for connecting said chuck to said prime mover to rotate the former includes a piston responsive to the application of said greater pressure by engaging a clutch to couple said chuck to said output shaft of said prime mover.

12. The power tool of claim 11 wherein said clutch includes an eccentrically mounted drive pin engageable within a complementary cavity in a clutch disc to transmit rotary motion of one to the other, one of said drive pin and said clutch disc being coupled to the output shaft of said prime mover and the other thereof being coupled to said chuck.

13. A portable hand power tool comprising a prime mover for axially rotating an output shaft, said prime mover being encased within a housing having as a part thereof a hand grip facilitating manual positioning and use of said tool, and a fluid pressure driver for converting said rotation of said output shaft to translation of a piston.

* * * * *